Feb. 25, 1958    J. SCHOENBERGER    2,824,748
BALANCED WHEELBARROW
Filed Nov. 10, 1954

INVENTOR.
JOHN SCHOENBERGER
BY
ATTORNEY

United States Patent Office 2,824,748
Patented Feb. 25, 1958

2,824,748

BALANCED WHEELBARROW

John Schoenberger, Cleveland, Ohio

Application November 10, 1954, Serial No. 467,910

2 Claims. (Cl. 280—47.26)

The present invention relates to carts, wheelbarrows and the like, and particularly to what I choose to term a balanced wheelbarrow.

The main object of my invention is to provide well balanced means for carting quantities of sand, lime, cement, mortar and the like from one point to another and first loading and finally unloading with a minimum of muscular effort being used by the workman doing the carting.

An ancillary object is to have such means pushed by hand as a wheelbarrow that so well balances a load carried thereby that at all times but small manual effort suffices to handle the load and push the same with facility.

Another object is to have a special wheelbarrow of such construction that it balances the load directly over the axis of rotation of a pair of supporting wheels that serve simultaneously to balance the whole sidewise.

A further object is to have such a wheelbarrow provided with an axle for the two wheels upon which it runs to which one wheel is preferably secured while the other wheel runs free, to allow the wheels to act as independent rotating supports facilitating turning sharp corners as well as running on curved and straight courses.

It is, of course an object of my invention to provide a wheelbarrow of the character indicated that may have its handles adjusted for different heights to accommodate workmen of different statures at will.

A practical object is, aside from the above, to have a wheelbarrow of such effective construction that it is strong and durable, has large capacity, handles well whether full or empty, and is reasonable in cost in order to encourage wide distribution on the market.

Other objects and advantages of my invention will appear more fully in detail as the specification proceeds.

In order to facilitate ready comprehension of this invention for a proper appreciation of the salient features thereof, the invention is illustrated on the accompanying drawing, and in which.

In these views, the same reference numerals indicate the same or like parts and features throughout.

Figure 1:
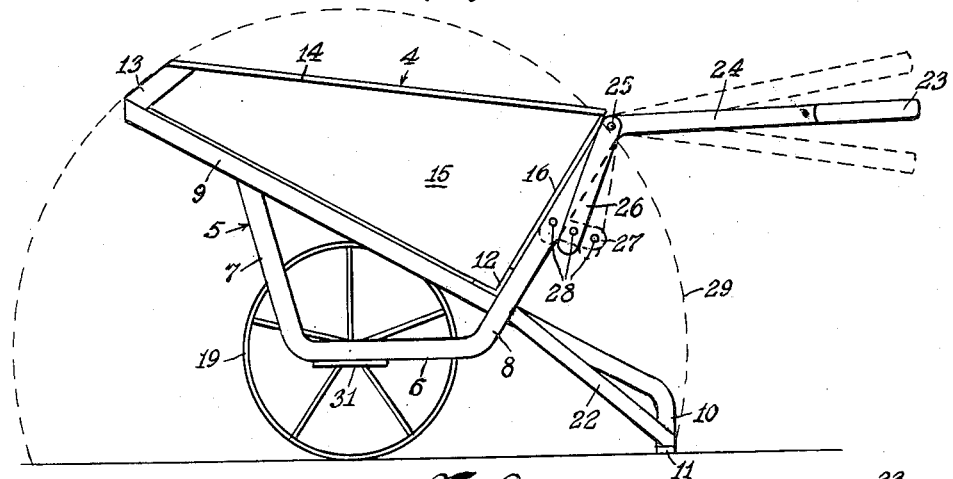
Figure 1 is a side elevation of a balanced wheelbarrow made according to this invention and embodying the same in a practical form.
Figure 2:
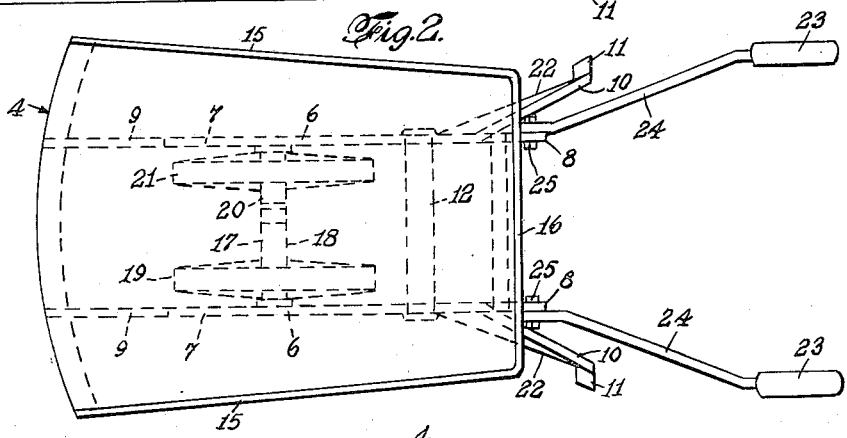
Figure 2 is a top plan view of the same wheelbarrow as seen from above in Figure 1.
Figure 3:
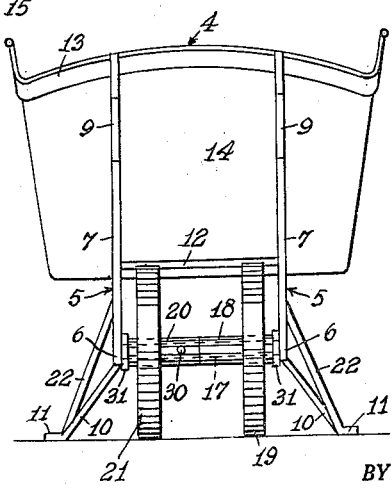
Figure 3 is a front elevation of the wheelbarrow as seen from the left in Figure 1.

Carts and wheelbarrows are of course well known and have been used for a long time, but usually, they have certain drawbacks and disadvantages. Among other defects might be mentioned that the load is often largely borne by the hands of a workman pushing the wheelbarrow, while as a rule, only one wheel supports one end of the barrow, so that both weight and balance depend largely on the strength of the hands of the workman.

Upon considering this problem, it has occurred to me that a wheelbarrow should be so balanced by two wheels against sidewise tipping that no effort need be wasted in attempting to keep the barrow balanced, and also so centrally supported by the same wheels beneath the load that they will carry the entire weight of the load. It should also be feasible to alter the positions of the handles to match the height of the workman using the wheelbarrow. As a result, I have succeeded in producing a wheelbarrow with the foregoing objects in view and embodying these desirable features in a practical form, as will now be described in detail in the following, so that all advantages appear as resulting from the novel construction involved.

Hence, in the practice of my invention, and referring also again to the drawing, a wheelbarrow, generally indicated at 4 primarily includes a pair of similar metal yoke members 5, 5 spaced laterally apart, each having a lower substantially horizontal portion 6 with an upwardly projecting end 7 and an upwardly rearwardly projecting end 8 of greater length than the forward end 7. At each side is a long rearwardly inclined side bar 9 secured to its respectively adjacent yoke end 7 but extending upwardly in the forward direction beyond said end 7. Rearwardly, each side bar 9 is secured to the rear end or arm 8 of the respectively adjacent yoke just above the bottom member 6, and extends a distance rearwardly beyond arm 8 and then is bent downwardly into a depending arm 10 terminating in a foot 11 adapted to rest on the ground when the apparatus is to stand still.

The two yokes and their side bars are interconnected at the junctions of the side bars with the rear arms 8, 8 by a transverse angle iron 12 and at the forward ends of the bars 9, 9 an arcuate bar 13 is secured to and extends beyond these side bars at both sides; between the side bars and upon the same is mounted an arcuate sheet metal trough or scoop member 14 that is secured upon and supported by the forward bar 13 and formed rearwardly into sides 15, 15 extending upwardly from the side bars 9 and rearwardly to arms 8. At that point, the trough or scoop member 14 with its sides 15 terminates at arms 8 and is secured to a transverse sheet metal back portion 16 secured to and resting against arms 8 above angle iron 12.

The side bars, yokes, angle iron and front bar 13 thus form a frame which determines the form of the sheet metal trough or scoop 14 supported thereby. Between the lower horizontal members 6, 6, an axle 17 is secured, and upon this axle is mounted a rotatable sleeve 18 having a supporting wheel 19 on this sleeve. On the same axle is fixed a second sleeve 20 having a second wheel 21 secured thereon, this wheel being equal in diameter to wheel 19 but spaced a short distance laterally from the same, so that the balance sidewise of the barrow will be maintained automatically thereby. The side bars 9, 9 are also reinforced by rearward inclined bars 22, 22 extending between feet 11 and arms 8 at their junction with side bars 9.

The axle 17 is located beneath the barrow in a central supporting position so that the weight of material in the same will be only slightly directed rearwardly toward feet 11 so that the barrow will tend to rest back on these feet when allowed to assume a stationary position, the immediate result being that the barrow rests on wheels 19 and 21 and feet 11.

In order to push the barrow, a pair of handles 23, 23 with handle bars 24, 24 pivoted to the upper ends of arms 8, 8 by bolts or pins 25, 25 have depending adjusting arms 26, 26. Also, the rear arms 8, 8 have rearwardly projecting lugs 27, 27 with a plurality of apertures 28. This allows the handles 23 to be adjusted to various positions according to the height of the workman serving to push the wheelbarrow, by inserting screw bolts into the hole in the lower end of the arm and one of the series of holes 28 in lug 27 on each arm 8. When the handles are thus set to selected position of adjustment, they are rigid with the frame of the wheelbarrow and the latter is then readily pushed and either filled or emptied by proper operation by means of these handles.

The construction and arrangement are such that the feet 11, the upper rear ends of arms 8 and back 16, as well as the front end with bar 13 of the barrow are all comprised within a semi-circular outline indicated in dotted line at 29, to facilitate rocking the barrow on wheels 19 and 21 as forming the center of support and operation for the whole.

The bars, yokes, reinforcements and the like mating or secured parts may be brazed or welded together, while the sleeve 20 is fixed by a pin 30 to axle 17 which is itself rotatably supported by bearings 31, 31 secured to bars 5, 5, the other sleeve being rotatable with its wheel on the axle, as already mentioned.

Manifestly, variations may be resorted to, and parts and features may be modified or used without others within the scope of the appended claims.

Having now fully described my invention, I claim:

1. A balanced wheelbarrow comprising a body member adapted to contain a load, mounted on a frame member consisting of a pair of similar yokes spaced laterally apart, each yoke having a lower substantial horizontal portion with an upwardly forwardly projecting end and an upwardly rearwardly projecting end of greater length than said forwardly projecting end; rearwardly inclined side bars secured to each of said yokes, said bars being bent downwardly to terminate in a foot member adapted to support said body member in an upwardly inclined position; an axle secured to the lower horizontal portion of said yokes, said axle being so positioned that the center of gravity of the load is substantially directly above the center of said axle; wheels laterally spaced substantially at the center of said axle; one of said wheels fixed upon said axle, the other free to rotate thereon; height-adjustable handle means pivotally mounted on said body consisting of a pair of handle arms bent to form depending adjustable arms at their pivoted junction with said body, the lower extremity of said depending arms disposed for adjustable engagement with rearwardly projecting lugs on said body member.

2. The wheelbarrow of claim 1 wherein two sleeves are provided on said axle, one of said sleeves bearing a wheel rigidly mounted thereon, the other sleeve having a wheel freely rotatable thereon.

References Cited in the file of this patent

UNITED STATES PATENTS

| | | |
|---|---|---|
| 772,253 | Ray | Oct. 11, 1904 |
| 1,325,557 | Cummins | Dec. 23, 1919 |
| 2,247,083 | Garlinghouse | June 24, 1941 |
| 2,249,019 | Masters | July 15, 1941 |
| 2,527,774 | Stieger | Oct. 31, 1950 |

FOREIGN PATENTS

| | | |
|---|---|---|
| 1,000,553 | France | Oct. 17, 1951 |